United States Patent [19]
Campbell et al.

[11] 3,885,391
[45] May 27, 1975

[54] HYDRAULIC BRAKING SYSTEM
[75] Inventors: Roy Campbell, Lickey Rock near Bromsgrove; Anthony George Price, Birmingham, both of England
[73] Assignee: Girling Limited, Brimingham, England
[22] Filed: June 25, 1973
[21] Appl. No.: 372,957

[30] Foreign Application Priority Data
July 7, 1972  United Kingdom............... 31847/72

[52] U.S. Cl. .................................................. 60/581
[51] Int. Cl. ............................................. F15b 7/08
[58] Field of Search..................... 60/581; 137/627.5

[56] References Cited
UNITED STATES PATENTS
3,228,731  1/1966  Valentine......................... 137/627.5
3,349,671  10/1967  Hoffman.............................. 91/420
3,568,441  3/1971  Walker................................ 60/581

Primary Examiner—Martin P. Schwadron
Assistant Examiner—H. Burks, Sr.
Attorney, Agent, or Firm—Scrivener, Parker, Scrivener and Clarke

[57] ABSTRACT

In a master cylinder assembly transfer chambers in master cylinders are connected by a transfer port or passage, and the transfer chambers are isolated from the pressure spaces of the cylinders by normally closed transfer valves which are adapted to be opened by axial movement of pistons in a brake applying direction. At least one of the master cylinders incorporates pressure relief means defining at least when the transfer valve is closed, a leak path between the transfer chamber of that master cylinder and a reservoir for fluid to compensate for increase in pressure in the chambers due to thermal expansion of the hydraulic fluid.

11 Claims, 6 Drawing Figures

FIG. 1.

PATENTED MAY 27 1975

3,885,391

SHEET 3

HYDRAULIC BRAKING SYSTEM

This invention relates to an improved master cylinder assembly and to an improved hydraulic braking system of the kind commonly used on agricultural tractors and like vehicles in which brakes on opposite sides of the vehicle are applied by fluid from the master cylinder assembly and transfer chambers in master cylinders are connected by a transfer port or passage, the transfer chambers being isolated from the pressure spaces of both cylinders by normally closed transfer valves which are adapted to be opened by axial movement of the pistons in a brake applying direction.

The master cylinders can be operated simultaneously for retarding the vehicle or separately for steering.

In hydraulic braking systems of the kind set forth it has been found that when the master cylinders are mounted close to the prime mover of the vehicle the pressure of hydraulic fluid within the transfer chambers increases due to thermal expansion of the fluid to a value which may become excessive. This characteristic occurs particularly when a tractor is stationary with the prime mover running to drive ancillary power take-off equipment.

The pressure in the transfer chambers acts on the main seal of each piston. When that pressure becomes excessive, the friction between each seal and the wall of the cylinder in which the piston carrying that seal works, increases to a value such that difficulty is experienced in advancing the piston in the bore to actuate the master cylinder. Furthermore, the pressure in the transfer chambers acts in a direction to urge the transfer valves into their closed positions, thus resisting actuation of the master cylinders. When a transfer valve is opened and the excessive fluid pressure released, such released fluid pressure acts in a manner to damage the seal or displace it from its intended position.

According to our invention in a master cylinder assembly for an hydraulic braking system of the kind set forth at least one of the master cylinders incorporates pressure relief means defining, at least when the transfer valve is closed, a leak path between the transfer chamber of that master cylinder and a reservoir for fluid to compensate for increase in pressure in the chambers due to thermal expansion of the hydraulic fluid.

Thus, the pressure in the chambers is relieved automatically and the pressure of fluid acting on the main seals of the pistons and on the transfer valves is maintained at a value which enables normal operation of the master cylinders to be carried out.

The pressure relief means may comprise a member of permeable or porous material incorporated in one or each master cylinder. Alternatively, the pressure relief means may comprise a leak path between two complementary members incorporated in each master cylinder.

Some embodiments of our invention are illustrated in the accompanying drawings in which:

FIG. 1 is a longitudinal section through a dual master cylinder assembly;

Figure 1:
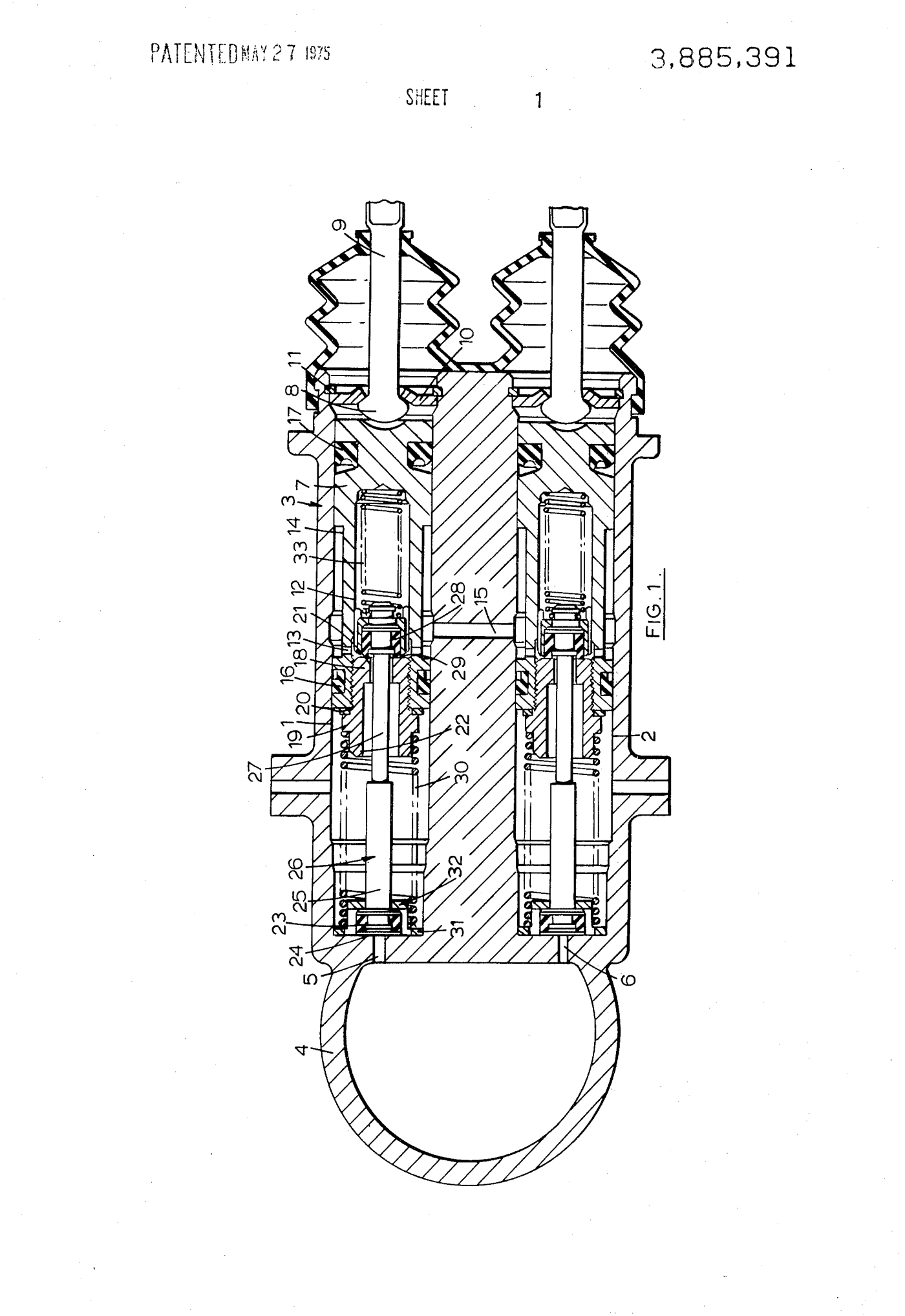
Figure 2:
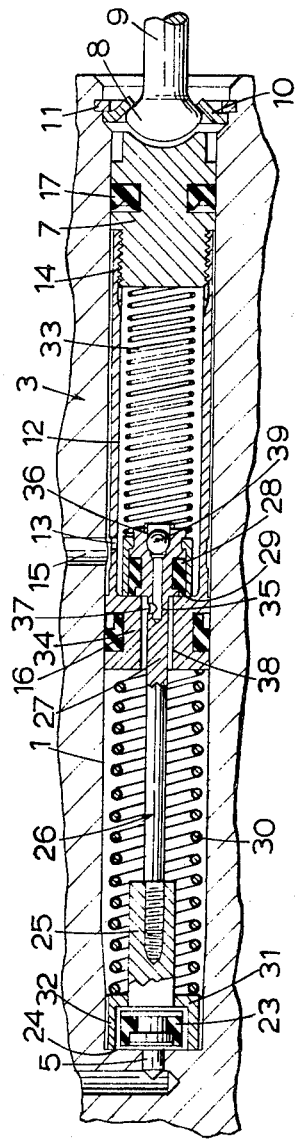
FIG. 2 is a longitudinal section through one of the master cylinders incorporated in the assembly of FIG. 1, but showing a modification.

In the dual master cylinder assembly illustrated in FIG. 1 of the accompanying drawings, two master cylinders are formed by parallel bores 1 and 2 in a common body or housing 3. The body or housing 3 incorporates an integral reservoir 4 for hydraulic fluid with which axial ports 5, 6 in the forward ends of the bores communicate.

As the two master cylinders are identical in construction, only one need be described A piston 7 working in the bore 1 is engaged at its rear end by a part-spherical head 8 on a pedal-operated push-rod 9. A stop for the head 8 is formed by an annular collar 10 located by a spring ring or circlip 11 received in an annular groove in the bore 1.

An axial passage 12 is drilled in the piston 7 from its forward end for about two thirds of the length of the piston and adjacent to its forward end the passage 12 is in communication through radial ports 13 with an annular recess 14 of substantial axial length in the peripheral surface of the piston 7. The length or the recess 14 is such that in all axial positions of the piston it is in communication through a transverse transfer port or passage 15 in the body with a corresponding recess of the other cylinder 2. The piston 7 is provided with a seal 16 in front of the recess 14 and with a main piston seal 17 behind the recess 14. The axial passage 12 and the annular recess 14 together define a transfer chamber.

A plug 18 having a radial flange 19 is screwed into the forward end of the passage 12 aand an annular washer 20 is clamped between mating faces of the flange 19 and the adjacent forward end of the piston 7. The annular washer 20 in one or both master cylinders is constructed from a permeable or porous material, conveniently sintered metal. A leakage path extending from passage 12 to the forward part of the cylinder 1 is thus provided by the washer 20 in series with the clearances between the screw threads between the plug 18 and the piston 7. In a modification the plug 18 may be constructed from a permeable or porous material, conveniently sintered metal, and the washer 20 may be omitted. The plug 18 is provided with an open-ended longitudinal bore 21 which is counterbored at 22 from its forward end.

The recuperation port 5 in the forward end of the cylinder 1 is controlled by a recuperation valve comprising a head 23 for engagement with a valve seating 24 surrounding the port 5. The head 23 is carried by the forward end of a greater diameter portion 25 of an axially extending stem or rod 26 of stepped form. The opposite inner end portion 27 of the rod 26 is of a diameter less than that of the bore 21 in the plug 18 and projects through the counterbore 22 and the bore 21 into the portion of the passage 21 between the plug 18 and the closed end of the passage 12. That opposite inner end of the rod 26 carries a head 28 for engagement with a valve seating 29 surrounding the bore 21 in the plug 18.

The piston 7 is held in a fully retracted position shown in the drawings by means of a compression return spring 30 acting between the flange 19 and a radial flange 31 of an apertured thimble 32 to hold the flange 31 in abutment with the cylinder wall surrounding the seating 24. The valve head 23 is guided to slide within the thimble 32 and, in this retracted position, the force in the spring 30 urges the valve head 23 away from its seating 24 and into engagement with its seating 29. Thus, in a normal inoperative position the rod 26 is subjected to a tensile force. The force of the spring 30 urging the head 28 into engagement with its seating 29 is augmented by a second weaker compression spring 33 which acts between the head 28 and the base of the passage 12.

In the retracted position shown in the drawings and as described above, the transfer chamber is isolated from a reservoir chamber defined by the portion of the bore 1 in front of the seal 16, due to engagement of the valve head 28 with the seating 29. In the event of the pressure of hydraulic fluid within a transfer chamber increasing due to thermal expansion of the fluid, the fluid seeps along the screw threads between the plug 18 and the piston 7 and then through the material of the washer 20 or the plug 18 into the reservoir chamber which, in turn, communicates with the reservoir 4 through the axial port 5 thereby relieving the pressure. When either the plug 18 or washer 20 of only one master cylinder is of a permeable or porous material, the pressure in the transfer chamber of the other master cylinder can be relieved to the reservoir indirectly through the washer 20 or plug 18 of the one master cylinder and the transfer passage or port 15.

When the piston 7 is advanced in the bore 1 by operation of the brake pedal with corresponding compression of the spring 30, a short forward movement is sufficient to cause the head 23 to engage with its seating 24 and isolate the reservoir from the pressure space forward of the piston substantially simultaneously with movement of the head 28 away from its seating 29. Preferably the movements of the heads with respect to the seatings take place simultaneously, and the stem 25 is subjected to a compressive force.

When the pressure relief means comprises a porous material, the degree of porosity is chosen to provide a slow leak rate which although sufficient to relieve the pressure due to thermal expansion is also sufficient to prevent fluid from escaping during the rapid rise in pressure to which the transfer chamber is subjected when the piston 7 is advanced in the bore 1 as described above.

Movement of the valve head 28 away from the seating 29 places the pressure space in communication with the annular recess 14 and with the transfer port or passage 15. Thereafter, further movement of the piston 7 in the same direction pressurises the fluid in the pressure space which is supplied to the brakes on that side of the vehicle through a radial outlet port.

However, if the piston of the other cylinder has not been advanced, the transfer valve in the piston of that cylinder remains closed and there can be no transfer of fluid between the pressure spaces of the two cylinders unless the pistons of both cylinders are advanced together by operation of both pedals.

When the pistons are advanced either independently or together as described above, the presence of the washers 20 in no way affects the performance of the master cylinders since opposite sides of each washer 20 are subjected to equal pressures when the head 28 incorporated in that master cylinder is held away from its seating 29.

Figure 3:
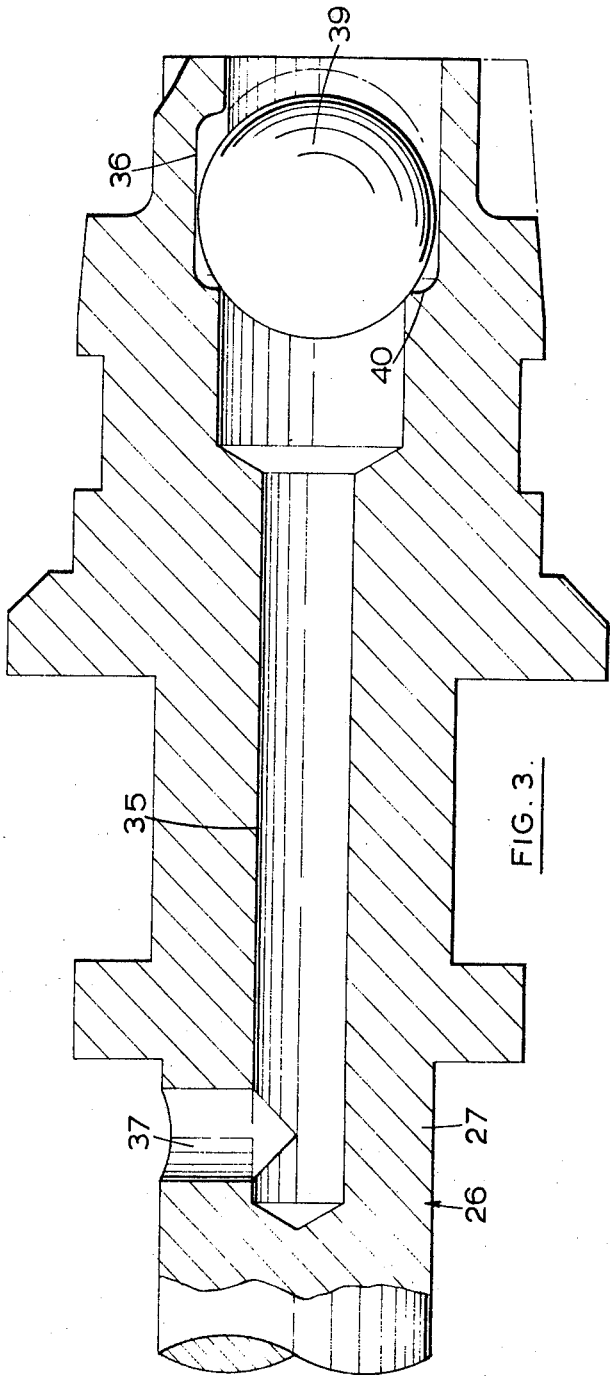
FIG. 3 is a longitudinal section on an enlarged scale through the inner end of a rod incorporated in construction of FIG. 2 with a flow path formed therein.

In the modified construction illustrated in FIGS. 2 and 3, the seals 16 and 17 are located in axially spaced grooves in axially spaced opposite ends portions of the piston assembly 7 which works in the bore 1. The washer 20 is omitted and the head 28 at the inner end of the rod 26 is normally urged into engagement with the seating 29 is defined by the internal face of an inwardly directed radial shoulder 34 adjacent to the inner end of the piston 7.

The inner end of the rod 26 incorporates an axial passage 35 which is enlarged at its free end at 36 and at its inner end communicates, through a radial port 37, with an annular space 38 defined between the rod 26 and the piston 7, which annular space comprises a part of the reservoir chamber.

A ball 39 is retained in the enlarged passage part 36 by crimping over the free end of the stem 26. The ball is of a diameter slightly smaller than that of the passage part 36 and is permitted a small movement with respect to an annular shoulder at the inner end of the passage part 36 which defines a seating 40 (FIG. 3). Normally the ball 39 rests on the base of the passage part 36 due to gravity and the ball 39 is therefore spaced from a major portion of the seating 40 to define a leak path.

When the pressure within the transfer chamber increases due to thermal expansion of the hydraulic fluid that pressure is insufficient to cause the ball 39 to engage with the seating 40. Thus the fluid can leak into the reservoir chamber through the leak path defined by the clearance between the ball 39, the wall of the passage part 36 and the seating 40 to relieve the pressure in the transfer chamber.

When a master cylinder is operated by its pedal, a sudden increase in pressure within its transfer chamber is transmitted through the transfer passage 15 to the transfer chamber of the other master cylinder and the pressure acts to urge the ball 39 of the said other master cylinder into engagement with the seating 40 to cut off flow through the leak path of the said other master cylinder. In FIG. 3 the ball 39 is shown in full engagement with the seating 40 and raised from the base of the passage part 36.

Figure 4:
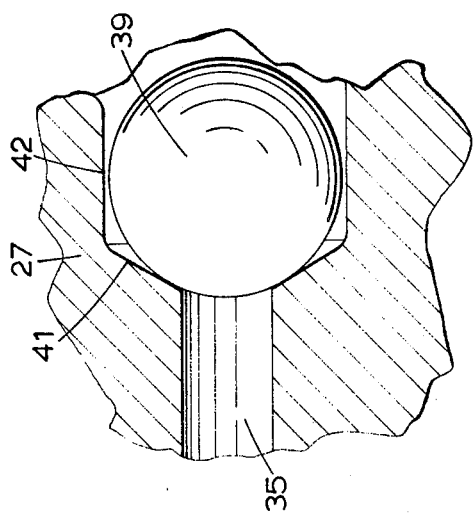
FIG. 4 is a section of the outer end of the rod shown in FIG. 3, but incorporating a modification.

In the modification illustrated in FIG. 4, the ball 39 is adapted to engage with a seating 41 defined by an inclined step between the passage 35 and a counterbore 42. The counterbore 42 is of diameter greater than that of the ball 39 and the step defining the seating 41 is inclined at an angle such that only an annulus between the passage 35 and the step defines the seating for the ball 39 when the master cylinder is operated by the pedal. The ball 39 is shown in FIG. 4 seated against the step and raised from the base of the counterbore 42.

Figure 6:
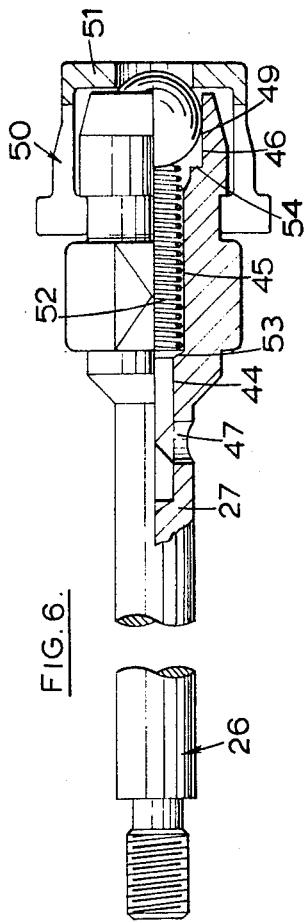
FIG. 6 is a part section on an enlarged scale at the rod incorporated in the master cylinder of FIG. 5.
Figure 5:
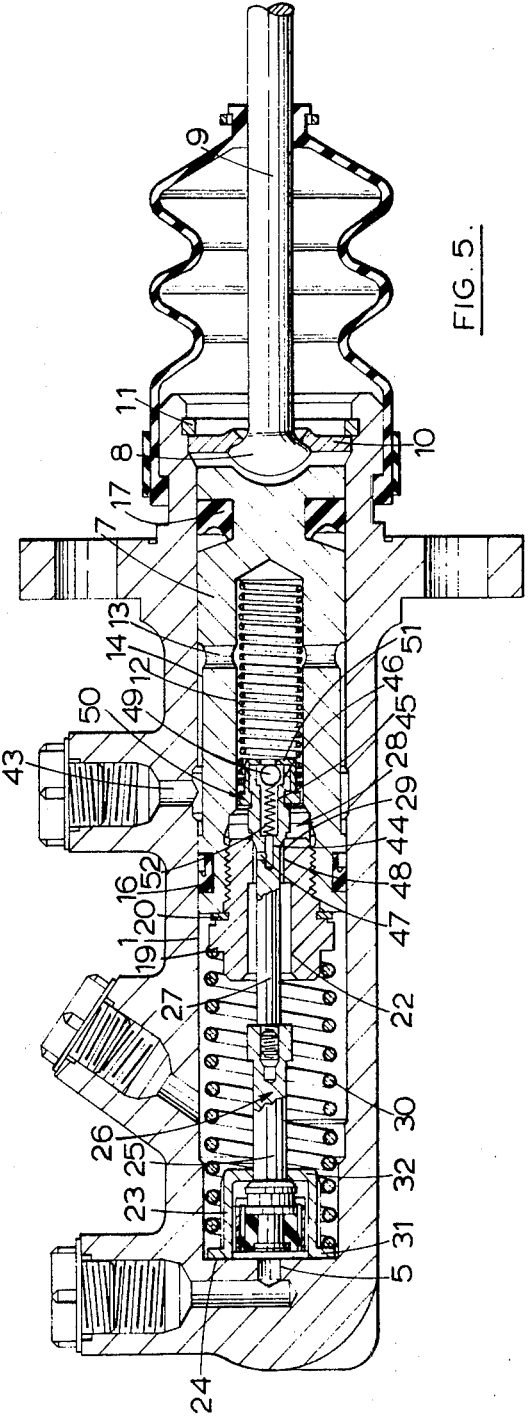
FIG. 5 is a longitudinal section through another construction of master cylinder.

The construction and operation of the embodiments described above with reference to FIGS. 2,3 and 4 are otherwise the same as the embodiments of FIG. 1 and corresponding reference numerals have been applied to the corresponding parts The master cylinder illustrated in FIGS. 5 and 6 is connected to a second identical master cylinder through an external connection defining the transfer port or passage and communicating with a radial port 43 which is equivalent to the port or passage 15.

The inner end of the stem 26 incorporates an axial passage 44 which is counterbored at 45 and again at 46 to define a valve chamber. The inner end of the of the passage 44 communicates, through a radial port 47, with an annular space 48 defined between rod 26 and the piston 7, which annular space comprises a part of the reservoir chamber.

A ball 49 is retained in the valve chamber 46 by means at centrally apertured and axially slotted end cap 50 of synthetic plastics material which fits over the inner end of the rod 26. The cap 50 has an inwardly directed annular flange 51 forming a stop against which the ball 49 is normally urged by means of a light compression spring 52 engaging at its inner end against an abutment 53 comprising a shoulder at the step in diameter between the bore 46 and the counterbore 45. In this position the ball 49 is spaced from a shoulder 54 at the step between the counterbores 45 and 46.

When the pressure within the transfer chamber increases due to thermal expansion of the hydraulic fluid therein, the fluid can leak into the reservoir chamber through a path defined by the central aperture and slots in the cap 50 and a clearance between the ball 49 and the wall of the counterbore 46.

When a master cylinder is operated by its pedal, a sudden increase in pressure within its transfer chamber is transmitted through the transfer connection to the transfer chamber of the other master cylinder, and the pressure acts to urge the ball 49 of the other master cylinder into engagement with the seating 54 against the force in the light compression spring 52 to cutoff flow through the leak path of the said other master cylinder.

The rate of the light spring 52 is chosen to ensure that, in an inoperative position of master cylinder, there is no tendency for the ball 49 to engage with the seating 54 accidently, whilst at the same time ensuring that the spring 52 can be compressed easily to permit the ball 49 to engage with the seating 54 when subjected to the pressure of fluid in the transfer connection when no other master cylinder is operated.

The construction and operation of this embodiment is otherwise the same as that of FIG. 1 and corresponding reference numerals have been applied to corresponding parts.

We claim:

1. An hydraulic master cylinder assembly for a vehicle braking system comprising first and second separate master cylinders, each comprising a piston adapted to work in a bore, a pressure space in said bore in front of said piston, means defining a transfer chamber, and a transfer valve which is normally closed and which is opened by movement of said piston in a direction to pressurise hydraulic fluid in said pressure space, wherein said transfer chambers are connected by a transfer passage and at least one of said master cylinders incorporates pressure relief means defining, at least when said transfer valve of said one master cylinder is closed, a leak path between said transfer chamber of that master cylinder and a recuperation port for connection to a reservoir for fluid to permit fluid seepage therebetween to compensate for increase in volume of fluid within said transfer chambers due to thermal expansion of hydraulic fluid.

2. A master cylinder as claimed in claim 1, wherein each master cylinder incorporates pressure relief means comprising a leak path.

3. A master cylinder assembly as claimed in claim 1, wherein said leak path incorporates a member of at least permeable material.

4. A master cylinder assembly as claimed in claim 1, wherein said leak path comprises a clearance between two complementary members in said first master cylinder.

5. A master cylinder assembly as claimed in claim 4, wherein said clearance is defined between a valve member and a complementary seating with which said valve member engages when subjected to pressure from the transfer chamber of said second master cylinder.

6. A master cylinder assembly as claimed in claim 5 wherein said valve member comprises a ball and a light compression spring is adapted normally to urge said valve member away from said seating.

7. A master cylinder assembly as claimed in claim 1, wherein each transfer valve comprises a seating in said piston, and a valve head for engagement with said seating, said pressure relief means being incorporated in said transfer valve.

8. A master cylinder assembly as claimed in claim 7, wherein the seating is of at least permeable material.

9. A master cylinder assembly as claimed in claim 7, wherein a rod extends through said seating and said head is carried by said rod, said rod being provided with a by-pass passage which by-passes said seating when said head is in engagement with it, a valve assembly incorporated in said head controlling fluid flow through said by-pass passage, said valve assembly being normally open to provide a leak path and being adapted to close when subjected to pressure in said transfer chamber of the other master cylinder.

10. A master cylinder assembly as claimed in claim 1, wherein each transfer valve comprises a seating in said piston, a transfer valve head for engagement with said seating, a rod extending through said seating and having a first end carrying said transfer valve head and a second end, and a recuperation valve controlling communication between said recuperation port and said pressure space comprising a recuperation seating surrounding said recuperation port, and a recuperation valve head for engagement with said recuperation seating carried by said second end of said rod.

11. A master cylinder assembly as claimed in claim 10, wherein said pressure relief means is incorporated in at least one of said rods.

* * * * *